Jan. 24, 1928.  H. M. SIEMANN  1,657,183
BEET HARVESTER
Filed Dec. 29, 1925  2 Sheets-Sheet 1

INVENTOR.
Henry M. Siemann
BY
ATTORNEY.

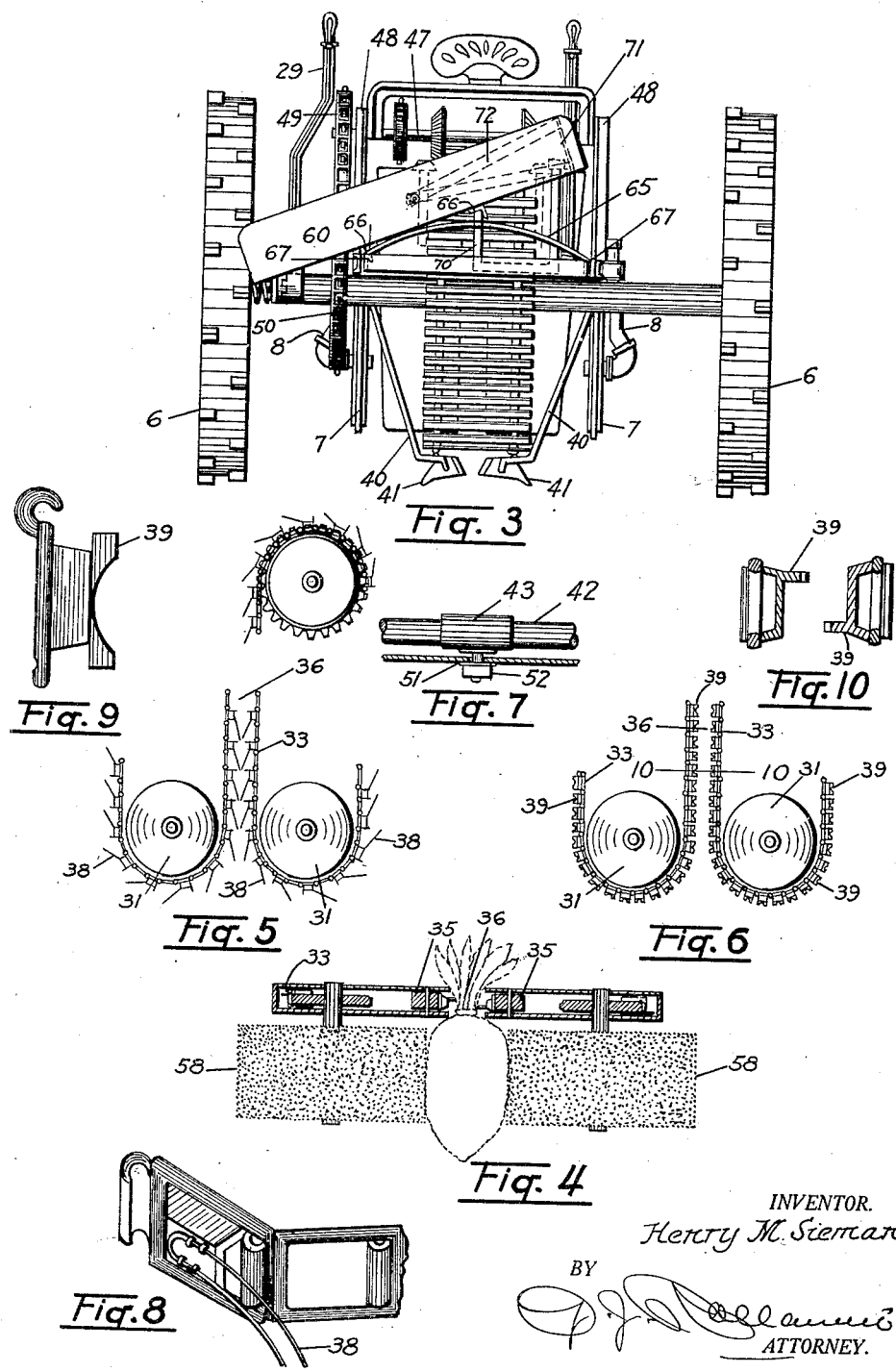

Patented Jan. 24, 1928.

1,657,183

UNITED STATES PATENT OFFICE.

HENRY M. SIEMANN, OF FORT LUPTON, COLORADO.

BEET HARVESTER.

Application filed December 29, 1925. Serial No. 78,156.

This invention relates to beet harvesting machines, and its principal object is to provide a machine of simple construction which when drawn along a row of beets, will lift them one at a time from the ground without injury to the plants and deliver them in perfect condition for the topper. A further object of the invention is to provide a machine of the above-described character in which the beets are lifted from the ground to an elevated point of discharge by engagement with its foliage, and another object resides in means for dumping beets thus lifted, on the ground in mounds of readily regulated quantities.

Figure 2:
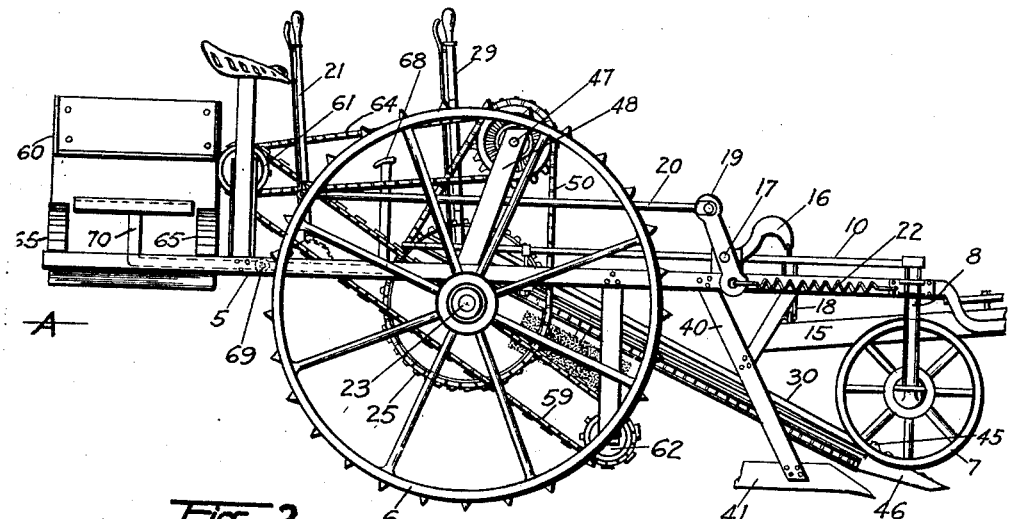
Figure 1:
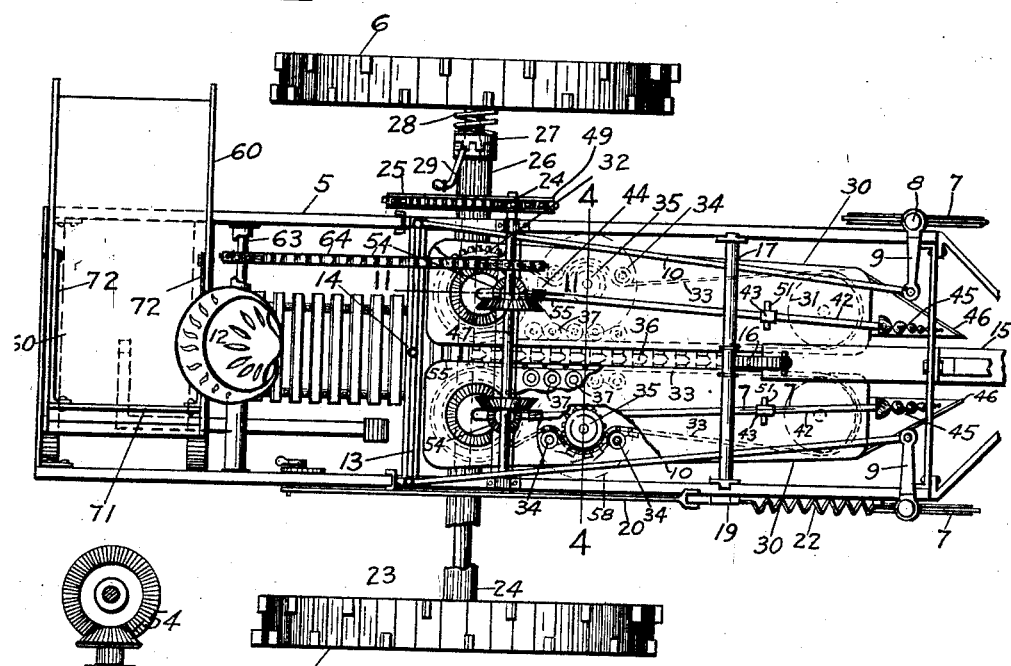

With the above and other objects in view, all of which will be fully set forth in the course of the following description, my invention consists in the construction, arrangement and combinations of parts illustrated in the accompanying drawings in which like characters of reference designate corresponding parts throughout the several views, and in which, Figure 1 represents a plan view of my improved harvester, Figure 2, a side elevation of the same, Figure 3, a rear end elevation of the machine looking in the direction of the arrow A in Figure 2, Figure 4, a transverse section along the line 4—4 in Figure 1, Figure 5, a fragmentary plan view of the endless chains which convey the beets by engagement with their foliage, Figure 6, a view similar to Figure 5, showing a modification in the construction of the chains, Figure 7, an enlarged fragmentary section taken on the line 7—7, Figure 1, Figure 8, a perspective view of two of the links of a chain of the form illustrated in Figure 5, Figure 9, an enlarged top view of one of the links of the chain shown in Figure 6.

Figure 11:
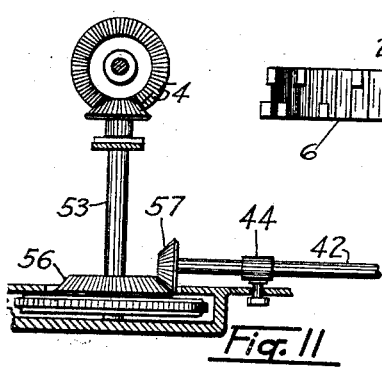

Figure 10, an enlarged section of the last mentioned chains along the line 10—10, Figure 6, and Figure 11, an enlarged section taken on the line 11—11, Figure 1.

Referring further to the drawings, 5 designates the rectangular frame of the machine supported on traction-wheels 6 and front steering-wheels 7. The last mentioned wheels are mounted at the lower ends of upright stems 8 which are rotatably supported in boxes at the front end of the frame and which at their upper extremities are provided with crank-arms 9 for the application of steering-rods 10 diverging rearwardly above the frame to within a short distance forward of the driver's seat 12.

The steering-rods are connected by a link 13 pivoted on a cross brace of the frame, as at 14, and adapted to be engaged by the feet of the operator of the machine, occupying the seat 12.

A tongue or pole 15 adapted for the attachment of two or more draft-animals or for connection with a tractor, as the case may be, is pivoted at the front end of the frame and its rear end is suspended from a goose-neck arm 16 on a shaft 17 by means of a chain 18.

The shaft is rotatably supported in boxes on the frame and a crank-arm 19 at one of its ends is by means of a rod 20 connected with an operating lever 21 fulcrumed within reach of the driver occupying the seat.

It will be apparent that when the tongue is supported in the harness of the draft animals, or connected with a tractor, rotation of the shaft 17 by means of the lever 21 will cause the frame to tilt about the axis of the shaft of the traction-wheels, and thereby adjust the position of the beet digging elements hereinafter to be described, relative to the ground. A spring 22 connecting the arm 19 with a stationary fastening on the frame yieldingly holds the parts in their normal position.

The traction-wheels are fixed at opposite ends of a shaft 23 which extends through a bearing sleeve 24 at the underside of the frame, and mounted on the shaft at one side of the frame, is a toothed wheel 25 by which the rotary movement of the shaft is transmitted to the operating mechanism of the machine.

The wheel 25 is loosely supported on the shaft by means of a hub 26 toothed at one end for the connection of a clutch-member 27 which is slidably keyed on the shaft. A spring 28 coiled around the shaft 23 normally holds the clutch-member in locking engagement with the hub of the driving-wheel, and a lever 29 is provided to disengage the members when it is desired to discontinue the operation of the mechanism during movement of the machine.

The elements so far described do not materially differ either in construction or arrangement from those ordinarily found in machines of similar type and in themselves form no part of the present invention.

Rigidly suspended from the frame in a forwardly slanting position are two chain-boxes 30 extending in a common plane and spaced from each other for the passage of the beets in the operation of the machine. Each box supports at its ends two wheels 31 and 32 between parallel top and bottom plates, and mounted on the wheels are endless chains 33 which in the operation convey the beets by engagement with their foliage.

The chains are tightened by idler wheels 34 and 35, and they bear at the inner edges of the boxes and at opposite sides of the space 36 between them, against series of rollers 37 which prevent the inner stretches of the two chains from separating and thereby aid them in maintaining their hold upon the beets.

In the form illustrated in Figures 5 and 8, each alternate link of the chain is provided with a resilient fork 38, the tines of which project rearwardly with relation to the direction in which the chains move when the machine is in operation. The resilient fork which extends longitudinally of the chain is approximately U-shaped and consists of parallel tines and a connecting transverse portion. It is secured to the supporting link adjacent the said transverse connecting portion of the fork. Each supporting link is provided with a raised support consisting of inwardly inclined sides and a flat connecting portion upon which the resilient fork is mounted. The flat portion of the support upon which the fork is mounted is of a width less than the length and the fork is also of a width materially less than that of the length. The tines of the forks of the spaced opposite stretches of the endless chains converge and have free terminals arranged in close proximity.

The forks of the two chains cooperate to grip the foliage of the beet plants and by their inherent resilience are capable of yielding under stress whereby to avoid injury to the beet-plants and whereby to permit of their passing freely between and around the idler wheels In the modified construction illustrated in Figures 6, 9 and 10, the chain-links are provided with outwardly projecting jaws 39 which in the stretches of the two chains at opposite sides of the beet-passage 36, are formed respectively at the upper and lower edges thereof. The chains thus constructed and arranged slightly crimp the foliage of the beets and thereby grip them securely for their conveyance to and beyond the upper end of the chain-boxes.

Fixed on the frame by means of suitably braced conveying arms 40, are two plowshares 41, the points of which project beneath and slightly forward of the chain-boxes to enter the ground at opposite sides of the row of beets along which the machine is propelled and thereby loosen the roots and lift them partially from the ground.

Two shafts 42 supported in bearings 43 and 44 on top of the chain-boxes, carry at their forward ends conical spirally twisted blades 45 which engage the foliage of the beets and by their rotary motion lift the stems and leaves thereof and bunch them together to be subsequently engaged by the endless chains 33. Shield-plates 46 of angle form fastened on the bottom plates of the chain-boxes 30, extend beneath and at the outer sides of the spiral blades to protect them from contact with obstructions on the ground, such as clods of plowed soil, in the forward movement of the machine.

A shaft 47 supported on standards 48, transversely of and above the frame of the machine, carries at one end a sprocket wheel 49 which by means of a chain 50 connects with the driving wheel 25 on the main shaft.

The chain-supporting wheels 32 at the upper ends of the chain-boxes have sprockets to drivingly engage the respective chains, and they are fixed at the lower ends of the shaft 53 mounted in boxes on a cross-member of the frame of the machine. Beveled gear-wheels 54 at the upper ends of the shafts 53 mesh with correspondingly formed wheels 55 of larger diameter on the cross-shaft 47, and beveled gear-wheels 56 formed or rigidly fastened upon the sprocket wheels 32, are exposed by circular openings in the top-plates of the gear-boxes to be engaged by beveled wheels 57 at the ends of the shafts 42 of the spirally twisted blades 45.

The boxes 43 of the shafts 42 are movable in transverse slots 51 in the top-plates of the respective gear-boxes and the boxes 44 which support the shafts adjacent their opposite ends, are pivoted to permit of lateral adjustment of the shafts in order to vary the distance between the spiral blades 45, according to the sizes of the beet plants. The movable boxes can be secured in their adjusted positions by nuts 52 at the ends of screw-threaded studs projecting through their slots.

Circular brushes 58 are fastened on the shafts of the idler wheels 35, extended through and below the bottom-plates of the chain-boxes, to engage with the roots of the beet plants carried upwardly between the two conveyor chains, for the purpose of removing adherent soil before the plants reach the point of their discharge at the upper end of the conveyor-element of which the chains are part.

The beet plants disengaged from the chains as the latter separate by movement around the sprocket wheels 32 at the upper end of the conveyor element, fall upon a moving endless apron 59 which carries them to a box 60 at the rear end of the machine.

The apron is preferably composed of slats fastened equi-distantly upon parallel endless chains which are trained around sprocket wheels 61 and 62 on two shafts mounted in bearings on members of the frame of the machine.

The upper shaft 63 of the apron, carries at one side thereof a sprocket-wheel which by means of a chain 64 is driven from a similar wheel on the cross-shaft 47.

In order to provide for a continuous operation, it is necessary that the beets received in the box 60 at the rear end of the machine, be discharged at intervals, to be subsequently removed from the field by wagons or other conveyances, and for the purpose of facilitating this work, it is desirable that the beets thus deposited in heaps, be placed alternately at opposite sides of the row in which they grew and from where they are pulled in the operation of the machine.

With the above stated object in view, the box is supported on a bridge composed of two arched members 65 at the rear end of the frame of the machine. The box is held in a slanting position at either end of the bridge by the engagement of transverse cleats 66 of angle section fastened on the underside of the box, with stops 67 at the ends of the bridge.

The box is open at its ends and in order to deliver its contents it is further tilted to any required angle by the operator of the machine through the medium of a foot-lever 68 fulcrumed as at 69, and provided with an upright arm 70 to engage with the bottom surface of the box, or preferably with one of the cleats thereof as shown in Figure 3 of the drawings.

The box may be closed at its upper end to prevent spilling of the beets, by means of a reversible tail board 71 fastened on arms 72 which are pivoted on the sides of the box intermediate of the ends of the same.

Having thus described my invention, its operation will be readily understood. The machine, driven along a row of beets in the field loosens the dirt at opposite sides of the beets and partially lifts them from the ground by means of the plow-points 41. The rotary twisted blades 45 which at the same time engage the foliage of the plants above the ground, lift and bunch the leaves and stems thereof together, and thus prepares them to be engaged by the chains 33 of the conveyor-element. The links of the chains provided either with the forks shown in Figure 5, or the jaws illustrated in Figure 6, grip the foliage of the plants and thereby carry them upwardly to the elevated point of discharge above the endless apron 59 which discharges them into the box 60. The roots of the beet plants are cleaned of adherent dirt during their upward movement, by means of the rotating brushes 58 and the box is emptied at intervals in the manner hereinbefore described.

It will be understood that by a slight change in the proportions and arrangement of the elements comprised in the machine, the beets may be discharged immediately into the box after being disengaged by the chains of the conveyor-element without the intermediary of the endless apron, and that other minor changes in the construction of the machines may be resorted to within the spirit of the invention.

The operator of the machine occupying the seat 12, not only controls the delivery of the beet plants by adjustment of the box 60, but also is enabled to regulate the distance of the operating mechanism from the ground by adjustment of the lever 21 and to discontinue the operation of the mechanism whenever necessary by adjustment of the clutch lever 29.

Having thus described my invention, what I claim and desire to secure by Letters Patent is:

1. In a beet harvester, a carriage, a conveyor thereon, comprising two moving members spaced apart and adapted to carry a beet between them by engagement with its foliage, and rotary brushes at opposite sides of the space between the members to engage the beet for the removal of adherent matter, the axes of rotation of the brushes being transverse to the direction of the moving conveyor.

2. In a beet harvester, a carriage, a conveyor thereon, comprising two moving members spaced apart and adapted to carry a beet between them by engagement with its foliage, a rotary brush-element to engage the beet for the removal of adherent matter, and means for the operation of the brush by movement of the conveyor-member.

3. In a beet harvester, a carriage, slanting boxes spaced apart thereon, and endless chains movably mounted in the boxes and having resilient members consisting of longitudinally disposed forks projecting in the space between the same and provided with converging tines having free terminal portions arranged in close proximity, to carry a beet by engagement with its foliage.

4. In a beet harvester, a carriage, slanting boxes spaced apart thereon, endless chains movably mounted in the boxes and having members projecting in the space between the same, to carry a beet by engagement with its foliage, rotary shafts on the boxes, spiral blades on the shafts adapted to bunch the foliage of a beet in the ground for engagement by the chains, and means for the operation of the chains and the shafts by movement of the carriage.

5. In a beet harvester, a carriage, slanting boxes spaced apart thereon, endless chains movably mounted in the boxes and having members projecting in the space between the same, to carry a beet by engagement with its foliage, rotary shafts on the boxes, spiral blades on the shafts adapted to bunch the foliage of a beet in the ground for engagement by the chains, the shafts being adjustably mounted to vary the distance between its blades, and means for the operation of the chains and the shafts by movement of the carriage.

6. In a beet harvester, a carriage, slanting boxes spaced apart thereon, endless chains movably mounted in the boxes and having members projecting in the space between the same, to carry a beet by engagement with its foliage, rotary shafts on the boxes, spiral blades on the shafts adapted to bunch the foliage of a beet in the ground for engagement by the chains, means for operating the chains by movement of the carriage, and means for the rotation of the shafts by movement of the chains.

7. In a beet harvester, a carriage, and a conveying element thereon comprising two revolving endless chains spaced apart to carry a beet between them and provided at intervals with supporting links having supports composed of inclined sides and a flat connecting portion, and resilient approximately U-shaped forks mounted upon the flat portions of the said supports, and forks of the opposite portions of the chain converging and having free terminal portions arranged in close proximity to engage the foliage of the beet.

8. In a beet harvester, a carriage, and a conveying element thereon comprising two revolving endless chains spaced apart to carry a beet between them and provided with pairs of longitudinally disposed prongs of resilient material arranged side by side to form cooperating pairs which converge towards the front of the harvester in the opposite direction to the movement of the endless members and having their points disposed approximately midway between the members, whereby the foliage of the beet is wedged between and yieldably gripped by the cooperating pairs of prongs.

In testimony whereof, I have hereunto affixed my signature.

HENRY M. SIEMANN.